March 8, 1966     W. G. WING     3,238,794
GYROSCOPIC APPARATUS
Filed Feb. 26, 1963
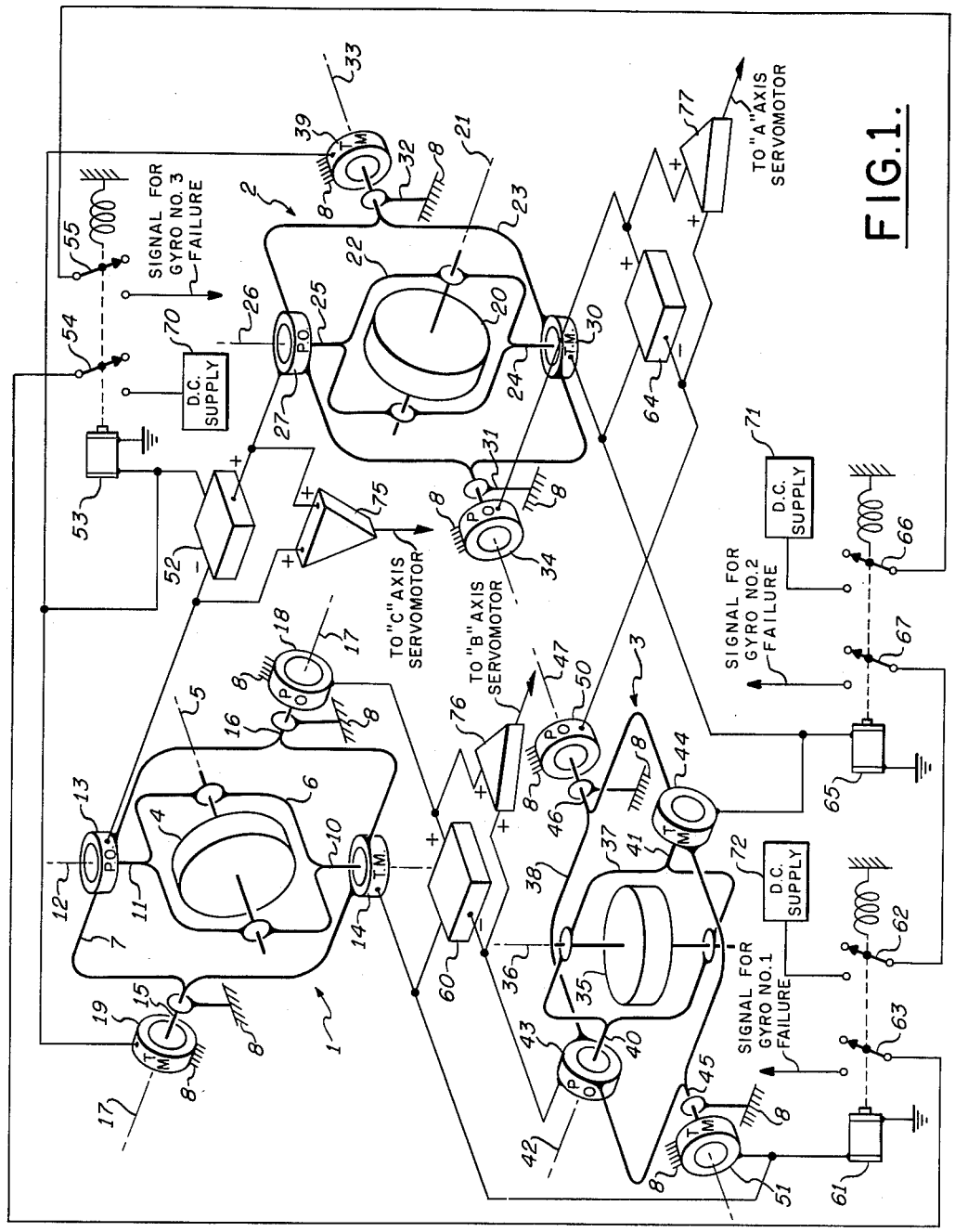
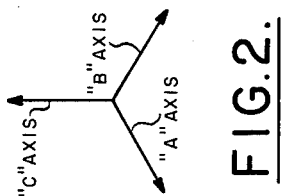
INVENTOR.
WILLIS G. WING
BY
*HP Jerry*
ATTORNEY United States Patent Office 3,238,794
Patented Mar. 8, 1966

3,238,794
GYROSCOPIC APPARATUS
Willis G. Wing, Glen Head, N.Y., assignor to Sperry Rand Corporation, Great Neck, N.Y., a corporation of Delaware
Filed Feb. 26, 1963, Ser. No. 261,006
13 Claims. (Cl. 74—5.34)

This invention relates to apparatus for providing accurate primary reference information and means for monitoring the apparatus to provide greatly increased reliability. It is particularly adapted for monitoring a plurality of gyroscopes to determine which one thereof is malfunctioning.

Many studies of the reliability of systems having revealed that redundancy of system elements can greatly improve the reliability of the overall system. In certain cases it is possible to achieve such redundancy by the relatively simple act of providing parallel paths for signals such that the failure of one signal path cannot interrupt the signal entirely.

In other systems it is possible to provide means to indicate the failure of a portion of the system and hence to cause automatic or manual switching out of the failed portion and switching in of a substitute.

In many systems, however, it has proven very difficult to provide for adequate redundancy because there is no evident basis for detecting the failure of a critical part of the system. This is particularly true where the part considered is a fundamental sensor of the system and where "failure" is simply deterioration of performance below an acceptable level. The trouble in this case results from the fact that the sensor operation appears perfectly normal and there is no alternate source of information to which to compare its output.

An excellent case in point is a gyroscope of an inertia guidance system. In this case, even if two single degrees of freedom gyros are included for each system axis, it is not possible to compare outputs and decide which gyro has failed if they do not agree. A decision is possible only if there are three gyros for each axis thus requiring nine gyros for three mutually perpendicular axes; in this case, if one gyro is not in agreement with the other two, it may be presumed to have failed.

The present invention provides apparatus by means of which in the case of gyros in an inertial guidance sysem, for example, a malfunctioning gyro can be singled out by utilizing only three two degree of freedom units and the remaining gyros will continue to provide information with respect to three mutually perpendicular reference axes. Under these conditions, since each gyro has two operating axes, there is a total of six operating axes and duplicate information is available with respect to all three reference axes although the inertial guidance system requires only three reference axes. Usually, when two degrees of freedom gyros are used there is redundancy of information on only one axis because two of these gyros are normally used, for example, as shown in U.S. Patent 2,977,806, entitled "Gyroscopic Apparatus," issued to A. W. Lane on April 4, 1961.

It is an object of the present invention to provide apparatus for monitoring a plurality of primary sensors.

It is an additional object of the present invention to provide gyroscopic apparatus comprising at least three gyroscopes providing reference information and means by which any malfunctioning gyroscope may be detected while the remaining gyroscopes continue to provide said reference information.

These and other objects will become apparent by referring to the specification and drawings, in which, FIG. 1 is a schematic diagram of gyroscopic apparatus incorporating the present invention, and
FIG. 2 is a diagram showing three mutually perpendicular reference axes.

Referring to FIG. 1, three gyroscopes 1, 2, and 3 are shown which may form a portion of a gyro stable platform of the type shown in U.S. Patent 2,591,697 entitled "Stable Reference Apparatus," issued to Hays, Jr., on April 8, 1952, or the aforementioned U.S. Patent 2,977,806, or they may be individually mounted in a vihicle such as an aircraft. Preferably, the gyroscopes 1, 2, and 3 have two degrees of freedom and therefore each provides reference information with respect to two perpendicular reference axes. The present invention will be described with respect to the gyroscopes 1, 2, and 3 forming a portion of a stable platform 8 indicated by slashed lines but for purposes of simplicity the platform 8 will not be shown in detail.

The gyroscope 1 is of conventional design having two degrees of freedom and includes a rotor 4 which spins around a horizontal axis 5 within an inner gimbal 6. The inner gimbal 6 is pivotally mounted within an outer gimbal 7 by means of spaced trunnions 10 and 11 which define a vertical reference axis 12. A pick-off 13 has its stator mounted on the gimbal 7 and its rotor connected for rotation with the gimbal 6 to provide a signal having a phase and amplitude representative of the direction and magnitude of rotation of the gimbal 6 with respect to a predetermined orientation. To apply a torque around the axis 12, a torque motor 14 has its stator mounted on the gimbal 7 and its armature connected to the gimbal 6. The gimbal 7 is mounted on the platform 8 on spaced trunnions 15 and 16 to pivot about a horizontal reference axis 17 defined by the trunnions 15 and 16. A pick-off 18 has its stator mounted on the platform 8 and its rotor mounted for rotation with the gimbal 7 to provide a signal having a phase and amplitude representative of the direction and magnitude of rotation of the gimbal 7 with respect to a predetermined orientation. To apply a torque around the axis 17, a torque motor 19 has its stator mounted on the platform 8 and its armature connected to the gimbal 7.

The gyroscope 2 is similar to gyroscope 1 in that it has two degrees of freedom and includes a rotor 20 which spins around a horizontal axis 21 within an inner gimbal 22. The inner gimbal 22 is pivotally mounted within an outer gimbal 23 by means of spaced trunnions 24 and 25 which define a vertical reference axis 26 that corresponds to the axis 12 of the gyroscope 1. A pick-off 27 has its stator mounted on the gimbal 23 and its rotor connected for rotation with the gimbal 22 to provide a signal having a phase and amplitude representative of the direction and magnitude of rotation of the gimbal 22 with respect to a predetermined orientation. To apply a torque around the axis 26, a torque motor 30 has its stator mounted on the gimbal 23 and its armature connected to the gimbal 22. The gimbal 23 is mounted on the platform 8 on spaced trunnions 31 and 32 to pivot about a horizontal reference axis 33 defined by the trunnions 31 and 32. A pick-off 34 has its stator mounted on the platform 8 and its rotor mounted for rotation with the gimbal 23 to provide a signal having a phase and amplitude representative of the direction and magnitude of rotation of the gimbal 23 with respect to a predetermined orientation. To apply a torque around the axis 33, a torque motor 39 has its stator mounted on the platform 8 and its armature connected to the gimbal 23. The gyroscopes 1 and 2 may be considered conventional directional gyroscopes.

The gyroscope 3 may be considered a conventional two degree of freedom vertical gyroscope and similarly it includes a rotor 35 which spins around a vertical axis 36 within an inner gimbal 37. The inner gimbal 37 is pivotally mounted within an outer gimbal 38 by means of spaced trunnions 40 and 41 which define a horizontal reference axis 42 that corresponds to the axis 17 of the gyroscope 1. A pick-off 43 has its stator mounted on the gimbal 38 and its rotor connected for rotation with the gimbal 37 to provide a signal having a phase and amplitude representative of the direction and magnitude of rotation of the gimbal 37 with respect to a predetermined orientation. To apply a torque around the axis 42, a torque motor 44 has its stator mounted on the gimbal 38 and its armature connected to the gimbal 37. The gimbal 38 is mounted on spaced trunnions 45 and 46 to pivot about a horizontal reference axis 47 defined by the trunnions 45 and 46. The axis 47 corresponds to the axis 33 of the gyroscope 2. A pick-off 50 has its stator mounted on the platform 8 and its rotor mounted for rotation with the gimbal 38 to provide a signal having a phase and amplitude representative of the direction and magnitude of rotation of the gimbal 38 with respect to a predetermined orientation. To apply a torque around the axis 47, a torque motor 51 has its stator mounted on the platform 8 and its armature connected to the gimbal 38.

The gyroscopes 1, 2, and 3 are so arranged that if any one of them malfunctions the other two will continue to provide information with respect to three mutually perpendicular reference axes A, B and C as shown in FIG. 2. The gyroscopes 1, 2, and 3 are further arranged in order that a first reference axis in one of the gyroscopes is parallel to and provides substantially the same information as that of a corresponding reference axis in a second gyroscope while the second reference axis in the first gyroscope is parallel to and provides substantially the same information with respect to a corresponding reference axis in a third gyroscope. Thus, for example, the reference axis 12 of gyroscope 1 is parallel to the reference axis 26 of gyroscope 2 while the reference axis 17 of gyroscope 1 is parallel to the reference axis 42 of gyroscope 3. Similarly, the reference axis 33 of gyroscope 2 is parallel to the reference axis 47 of gyroscope 3.

To compare the relative orientations of the axes 12 and 26, the pick-offs 13 and 27 associated with the respective axes are connected to a difference amplifier network 52 which in turn is connected to a relay 53. The relay 53 has a pair of ganged contact arms 54 and 55. In the network 52, the signal from the pick-off 13 is subtracted from the signal from the pick-off 27 as indicated by the plus and minus signals. In a similar manner, to compare the relative orientations of the axes 17 and 42, pick-offs 18 and 43 associated with the respective axes are connected to a difference amplifier network 60 which in turn is connected to a relay 61 having ganged contact arms 62 and 63. Similarly, to compare the orientations of the axes 33 and 47, pick-offs 34 and 50 are connected to a difference amplifier network 64 which in turn is connected to a relay 65 having ganged contact arms 66 and 67. Each of the relays 53, 61 and 65 is energized when the difference between the signals from their associated pick-offs exceeds a predetermined threshold magnitude in a manner to be more fully explained.

In order to provide a signal when gyroscope 1 malfunctions, a D.C. supply 70 is connected through the contact arm 54 of relay 53 and through the contact arm 63 of the relay 61 when the relays 53 and 61 are energized. Similarly, to provide a signal indicative of malfunction of the gyroscope 2, a D.C. supply 71 is connected through the contact arms 66 and 55 when the relays 65 and 53 are energized. To provide a signal indicative of malfunction of the gyroscope 3, a D.C. supply 72 is connected through the contact arms 62 and 67 when the relays 61 and 65 are energized. Normally, all the contact arms are spring-biased to their open positions as shown in FIG. 1 and the relays 53, 61 and 65 are unenergized.

With the gyroscopes 1, 2 and 3 operating normally, i.e., within acceptable limits of normal gyroscopic drift, the related axes 12 and 26, 17 and 42, and 33 and 47 remain oriented substantially parallel with respect to each other. Any slight deviation of a pair of related axes from a parallel condition produces only a small signal from the associated network which is below the threshold bias of the respective relay. Therefore, the relays 53, 61 and 65 remain unenergized and the contact arms associated therewith remain in their spring-biased open positions, as shown in FIG. 1 and no malfunction signal is produced.

Assuming now that there is a malfunction of the gyroscope 1 in the sense that the information which it provides deteriorates below an acceptable level, the axis 12 of the gyroscope 1 will depart from the normally substantially parallel relationship with the related axis 26 of the gyroscope 2 and the axis 17 of gyroscope 1 will depart from the normally substantially parallel relationship with the related axis 42 of gyroscope 3. Therefore, the pick-off 13 of gyroscope 1 will provide a signal which disagrees with that from the pick-off 27 of gyroscope 2 to the extent that an output signal is provided from the difference network 52 which exceeds the threshold bias of the relay 53 thereby energizing the relay 53 and closing the contact arms 54 and 55. At the same time the signal from the pick-off 18 of gyroscope 1 will provide a signal which disagrees with that from the pick-off 43 of the gyroscope 3 to the extent that an output signal is provided from the difference network 60 which exceeds the threshold bias of the relay 61 thereby energizing the relay 61 and closing the contact arms 61 and 63. Closing the contact arms 54 and 63 completes a circuit from the D.C. supply 70 through contact arms 54 and 63 to thereby provide a signal indicative of the malfunction of gyroscope 1 where indicated by the legend which may then be connected to utilization apparatus to disconnect the gyroscope 1, provide a warning signal, or for other suitable purposes.

During this time, the gyroscopes 2 and 3 continue to function normally and therefore the axes 33 and 47 remain in agreement and any slight signal output from the network 64 does not exceed the threshold bias of the relay 65. The relay 65 thus remains unenergized and its contact arms 66 and 67 remain open as shown thereby preventing any malfunction signal from appearing where indicated by the respective legends for gyroscopes 2 and 3. From this it may be seen that the gyroscope 1 can be isolated as the malfunctioning gyroscope and its removal from operation will still leave the total system with three operating mutually perpendicular reference axes, e.g., 26, 33 and 42, corresponding to the axes C, A and B of FIG. 2.

The above embodiment of the present invention teaches the use of relay logic, for purposes of simplicity, to determine and disable a particular malfunctioning gyroscope. It will be appreciated that other means may be utilized, for example, transistor switches could also be used with a substantial reduction in size and improvement in reliability.

For systems in which operating times are very great and small relative drift rates could accumulate to create large difference signals, the difference signal for each pair of related axes may be connected back to an appropriate torquing device on each of the gyros involved; the sensing being such as to tend to eliminate the difference signal. As shown in FIG. 1, for example, this may be accomplished by connecting the outputs of the difference amplifying networks to respective torquing devices. Thus, the output of the network 52 is connected to torque motors 19 and 39; the output of the network 60 is connected to torque motors 14 and 51; and the output of the network 64 is connected to torque motors 30 and 44. The difference signal now becomes a measure of the relative drift rate and is suitable for failure detection.

A feature of this invention is that the utilization of redundant information with respect to a particular operating reference axis provides a resultant platform drift rate with respect to that axis which is the mean value of the individual gyro drift rates with a resultant $\sqrt{2}$ improvement in the average drift rate in accordance with the teachings of said U.S. Patent 2,977,806.

Another feature of the present invention is that the sum of the redundant gyro error signals may be used to drive the corresponding servomotor of the stable platform 8 upon which the gyroscopes are mounted. Thus, the sum of the signals from the pick-offs 13 and 27 may be connected to a summing amplifier 75 which has its output connected to energize the servomotor associated with the C axis as indicated by the legend. Similarly, the sum of the signals from the pick-offs 18 and 43 may be connected to a summing amplifier 76 which has its output connected to the servomotor associated with the B axis while the sum of the signals from the pick-offs 34 and 50 are connected to a summing amplifier 77 which has its output connected to the servomotor associated with the A axis of the platform where the platform, for example, may be of the type described with respect to said U.S. Patent 2,591,697.

It will be appreciated, therefore, that the present invention provides gyroscopic apparatus which includes all of the advantages described in said Patents 2,977,806 and 2,591,697, while providing reliability of the overall system that is appreciably greater than that provided by either of said patented systems. It will be further appreciated that the present invention may be utilized with respect to other types of apparatus including fluid sphere gyros of the type shown in U.S. Patent 3,058,359 entitled "Fluid Rotor Gyroscopic Apparatus" issued to the instant inventor on October 16, 1962, as well as other types of exotic gyros.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. In gyroscopic apparatus,
   (1) means including first, second and third gyroscopes, any two of which provide reference information with respect to three mutually perpendicular reference axes,
   (2) each of said gyroscopes having first and second reference axes, the first reference axis of any one of said gyroscopes being oriented in a predetermined relationship with respect to the corresponding reference axis of another gyroscope and the second reference axis thereof being oriented in a predetermined relationship with respect to the corresponding reference axis of yet another gyroscope, thereby providing related pairs of axes being oriented to provide substantially duplicate information,
   (3) pick-off means responsive to the movements of said gyroscopic reference axes for providing measures in accordance with the deviation of each of said axes from respective predetermined orientations, and
   (4) means including comparison means responsive to the deviation measures of said related pairs of axes for providing a discrete signal when the difference between the orientation of a related pair of axes exceeds a predetermined amount.

2. In apparatus of the character described in claim 1, further including,
   (1) a gyroscopic stable platform upon which said first, second and third gyroscopes are mounted, said first gyroscope having first and second reference axes, said second gyroscope having third and fourth reference axes, said third gyroscope having fifth and sixth reference axes, said first and third, fourth and fifth, second and sixth reference axes forming related pairs of axes being oriented to provide substantially duplicate information with respect to said axes,
   (2) first servo means responsive to said first and third signals for stabilizing said platform about an axis parallel to said first and third reference axes,
   (3) second servo means responsive to said fourth and fifth signals for stabilizing said platform about an axis parallel to said fourth and fifth reference axes, and
   (4) third servo means responsive to said second and sixth signals for stabilizing said platform about an axis parallel to said second and sixth references axes.

3. In gyroscopic apparatus,
   (1) means including first, second and third gyroscopes, any two of which provide reference information with respect to three mutually perpendicular reference axes,
   (2) each of said gyroscopes having first and second reference axes, the first reference axis of any one of said gyroscopes being oriented parallel to the corresponding reference axis of another gyroscope and the second reference axis thereof being oriented parallel to the corresponding reference axis of yet another gyroscope, thereby providing related pairs of axes being oriented to provide substantially duplicate information,
   (3) pick-off means responsive to the movements of said gyroscopic reference axes for providing measures representative of the deviation of each of said related pairs of axes from parallel, and
   (4) means including comparison means responsive to said measures of said related pairs of axes for providing a discrete signal when the difference between the orientation of a related pair of axes exceeds a predetermined amount.

4. In apparatus of the character described in claim 3, further including means responsive to the relative orientation of each of said related pairs of axes for precessing the gyroscopes associated therewith in directions tending to eliminate any deviation from said parallel orientation, thereby providing a reference measure with respect to each of said pairs which is the average of the orientations of said related pair.

5. In apparatus of the character described in claim 3, further including,
   (1) a gyroscopic stable platform upon which said first, second and third gyroscopes are mounted, said first gyroscope having first and second reference axes, said second gyroscope having third and fourth reference axes, said third gyroscope having fifth and sixth reference axes, said first and third, fourth and fifth, second and sixth reference axes forming related pairs of axes being oriented to provide substantially duplicate information with respect to said axes,
   (2) first servo means responsive to said first and third signals for stabilizing said platform about an axis parallel to said first and third reference axes,
   (3) second servo means responsive to said fourth and fifth signals for stabilizing said platform about an axis parallel to said fourth and fifth reference axes, and
   (4) third servo means responsive to said second and sixth signals for stabilizing said platform about an axis parallel to said second and sixth reference axes.

6. In gyroscopic apparatus,
   (1) a first gyroscope having first and second reference axes,
   (2) a second gyroscope having third and fourth reference axes,
   (3) a third gyroscope having fifth and sixth reference axes.
   (4) said first, second and third gyroscopes being so constructed and arranged as to provide reference information with respect to three mutually perpendicular axes from any two of said three gyroscopes, (5) said first and third, fourth and fifth, second and sixth reference axes forming related pairs of axes being oriented parallel to provide substantially duplicate information with respect to said pairs of axes, (6) pick-off means responsive to the movements of said gyroscopic reference axes for providing measures representative of the deviation of each of said related pairs of axes from parallel, and (7) means including first, second, and third comparison means responsive to said measures of said first and third, fourth and fifth, and second and sixth pairs of axes, respectively, for providing a discrete signal when the axes of a related pair deviate with respect to their predetermined orientation beyond a predetermined amount.

7. In apparatus of the character described in claim 6, further including torquing means responsive to the relative orientation measures of each of said related pairs of axes for precessing the gyroscopes associated therewith in directions tending to eliminate any deviation from said parallel orientation thereby providing a reference measure with respect to each of said pairs which is the average of the orientations of said related pairs.

8. In gyroscopic apparatus,
(1) a first two degree of freedom gyroscope having first and second reference axes,
(2) a second two degree of freedom gyroscope having third and fourth reference axes,
(3) a third two degree of freedom gyroscope having fifth and sixth reference axes,
(4) said first, second and third gyroscopes being so constructed and arranged as to provide primary reference information with respect to three mutually perpendicular axes from any two of said three gyroscopes,
(5) said first and third, fourth and fifth, second and sixth reference axes forming related pairs of axes being oriented parallel to provide substantially duplicate information with respect to said axes,
(6) first comparison means responsive to the orientation of said first and third axes,
(7) second comparison means responsive to the orientation of said fourth and fifth axes,
(8) third comparison means responsive to the orientation of said second and sixth axes,
(9) first means responsive to said first and third comparison means for providing a signal representative of malfunction of said first gyroscope when there is relative deviation between said first and third axes, and said second and sixth axes respectively, in excess of a predetermined amount,
(10) second means responsive to said first and second comparison means for providing a signal representative of malfunction of said second gyroscope when there is relative deviation between said first and third axes, and said fourth and fifth axes, respectively, in excess of a predetermined amount, and
(11) third means responsive to said second and third comparison means for providing a signal representative of malfunction of said third gyroscope when there is relative deviation between said fourth and fifth axes, and said second and sixth axes, respectively, in excess of a predetermined amount.

9. In apparatus of the character described in claim 8, further including torquing means responsive to the relative orientation measures of each of said related pairs of axes for precessing the gyroscopes associated therewith in directions tending to eliminate any deviation from said parallel orientation, thereby providing a reference measure with respect to each of said pairs which is the average of the orientations of said related pair.

10. In apparatus of the character described in claim 8, further including, (1) a gyroscopic stable platform upon which said first, second and third gyroscopes are mounted,
(2) first servo means responsive to said first and third signals for stabilizing said platform about an axis parallel to said first and third reference axes,
(3) second servo means responsive to said fourth and fifth signals for stabilizing said platform about an axis parallel to said fourth and fifth reference axes, and
(4) third servo means responsive to said second and sixth signals for stabilizing said platform about an axis parallel to said second and sixth reference axes.

11. In gyroscopic apparatus,
(1) a first two degree of freedom gyroscope having first and second reference axes and first and second pickoffs for providing information with respect to said first and second axes, respectively,
(2) a second two degree of freedom gyroscope having third and fourth reference axes and third and fourth pickoffs for providing information with respect to said third and fourth axes, respectively,
(3) a third two degree of freedom gyroscope having fifth and sixth reference axes and fifth and sixth pickoffs for providing information with respect to said fifth and sixth axes, respectively,
(4) said first, second and third gyroscopes being so constructed and arranged as to provide primary reference information with respect to three mutually perpendicular axes from any two of said three gyroscopes,
(5) said first and third, fourth and fifth, second and sixth reference axes forming related pairs of axes being oriented parallel to provide substantially duplicate information from their respective pickoffs with respect to said axes,
(6) first comparison means responsive to said first and second pickoffs for providing a first signal representative of the difference therebetween,
(7) second comparison means responsive to said fourth and fifth pickoffs for providing a second signal representative of the difference therebetween,
(8) third comparison means responsive to said second and sixth pickoffs for providing a third signal representative of the difference therebetween,
(9) first means responsive to said first and third signals for providing a first malfunction signal representative of the malfunction of said first gyroscope when said first and third signals exceed a predetermined threshold value,
(10) second means responsive to said first and second signals for providing a second malfunction signal representative of the malfunction of said second gyroscope when said first and second signals exceed a predetermined threshold value, and
(11) third means responsive to said second and third signals for providing a third malfunction signal representative of the malfunction of said third gyroscope when said second and third signals exceed a predetermined threshold value.

12. Apparatus of the character described in claim 11 in which
(1) said first gyroscope further includes first and second torquing means for precessing said first gyroscope with respect to said first and second reference axes, respectively,
(2) said second gyroscope further includes third and fourth torquing means for precessing said second gyroscope with respect to said third and fourth reference axes, respectively,
(3) said third gyroscope further includes fifth and sixth torquing means for precessing said third gyroscope with respect to said fifth and sixth reference axes, respectively,
(4) said first and third torquing means being responsive to said first signal for precessing said first and second gyroscopes in directions tending to eliminate any deviation from said parallel orientation of said first and third axes, (5) said fourth and fifth torquing means being responsive to said second signal for precessing said second and third gyroscopes in directions tending to eliminate any deviation from said parallel orientation of said fourth and fifth axes, (6) said second and sixth torquing means being responsive to said third signal for precessing said first and third gyroscopes in directions tending to eliminate any deviation from said parallel orientation of said second and sixth axes thereby providing a reference measure with respect to each of said pairs which is the average of the orientations of said related pair.

13. In apparatus of the character described in claim 11, further including, (1) a gyroscopic stable platform upon which said first, second and third gyroscopes are mounted,
(2) first servo means responsive to said first and third signals for stabilizing said platform about an axes parallel to said first and third reference axes,
(3) second servo means responsive to said fourth and fifth signals for stabilizing said platform about an axis parallel to said fourth and fifth reference axes, and
(4) third servo means responsive to said second and sixth signals for stabilizing said platform about an axis parallel to said second and sixth reference axes.

References Cited by the Examiner

UNITED STATES PATENTS

| | | | |
|---|---|---|---|
| 2,591,697 | 4/1952 | Hays | 74—5.34 |
| 2,898,766 | 8/1959 | Pittman | 74—5.34 |
| 2,977,806 | 4/1961 | Lane | 74—5.34 |

BROUGHTON G. DURHAM, *Primary Examiner.*

MILTON KAUFMAN, *Examiner.*